United States Patent [19]
Westphal

[11] Patent Number: 5,101,964
[45] Date of Patent: Apr. 7, 1992

[54] TRANSPORTATION PALLET SYSTEM
[75] Inventor: Larry B. Westphal, East Detroit, Mich.
[73] Assignee: Douglas & Lomason Company, Farmington Hills, Mich.
[21] Appl. No.: 657,967
[22] Filed: Feb. 20, 1991

Related U.S. Application Data
[63] Continuation of Ser. No. 384,028, Jul. 24, 1989, abandoned.

[51] Int. Cl.$^5$ .............................................. B65G 17/00
[52] U.S. Cl. ................................. 198/803.01; 108/901; 108/51.1; 108/55.5; 206/386
[58] Field of Search ................. 198/803.01, 803.2; 108/51.1, 53.1, 54.1, 55.3, 55.5, 901, 902; D34/38; 206/386; 248/346; 269/900

[56] References Cited
U.S. PATENT DOCUMENTS

| | | | |
|---|---|---|---|
| 2,575,278 | 11/1951 | Kearney | 198/803.01 |
| 3,396,678 | 8/1968 | Jensen | 108/55.5 X |
| 3,807,035 | 4/1974 | Moorman et al. | 108/51.1 X |
| 3,917,108 | 11/1975 | Thurman | 108/53.1 X |
| 4,015,710 | 4/1977 | Biggs | 108/55.5 X |
| 4,167,999 | 9/1979 | Haggerty | 198/803.2 X |
| 4,597,338 | 7/1986 | Kreeger | 108/902 X |
| 4,684,012 | 8/1987 | Feddersen | 198/803.01 |
| 4,729,483 | 3/1988 | Schrader | 108/51.1 X |
| 4,782,763 | 11/1988 | Salloum | 108/901 X |

FOREIGN PATENT DOCUMENTS

| | | | |
|---|---|---|---|
| 1252138 | 10/1967 | Fed. Rep. of Germany | 108/53.1 |
| 2216053 | 7/1973 | Fed. Rep. of Germany | 108/55.3 |
| 0184028 | 11/1982 | Japan | 108/55.3 |
| 0199446 | 11/1984 | Japan | 108/901 |
| 0124421 | 6/1986 | Japan | 198/803.01 |

Primary Examiner—Robert P. Olszewski
Assistant Examiner—James R. Bidwell
Attorney, Agent, or Firm—Harness, Dickey & Pierce

[57] ABSTRACT

A transportation pallet system for mounting, transporting, and handling a workpiece, such as a prefabricated automobile seat, which facilitates the installation of the workpiece into a final product where the final installation process is accomplished by a computer-controlled robotic device. A base pallet formed by injection molding plastic has a honeycombed configuration of supporting ribs and supporting brackets. An intermediary footplate also formed by injection molding plastic secures the workpiece to the base pallet. Mounting holes located at the intersections of the honeycombed ribs secure the intermediate footplate to the base pallet at a precise location relative to a pair of precisely sized and precisely located datum holes, also within the base pallet. The datum holes allow the computer-controlled robotic device to locate the base pallet and the mounted workpiece with precision.

13 Claims, 2 Drawing Sheets

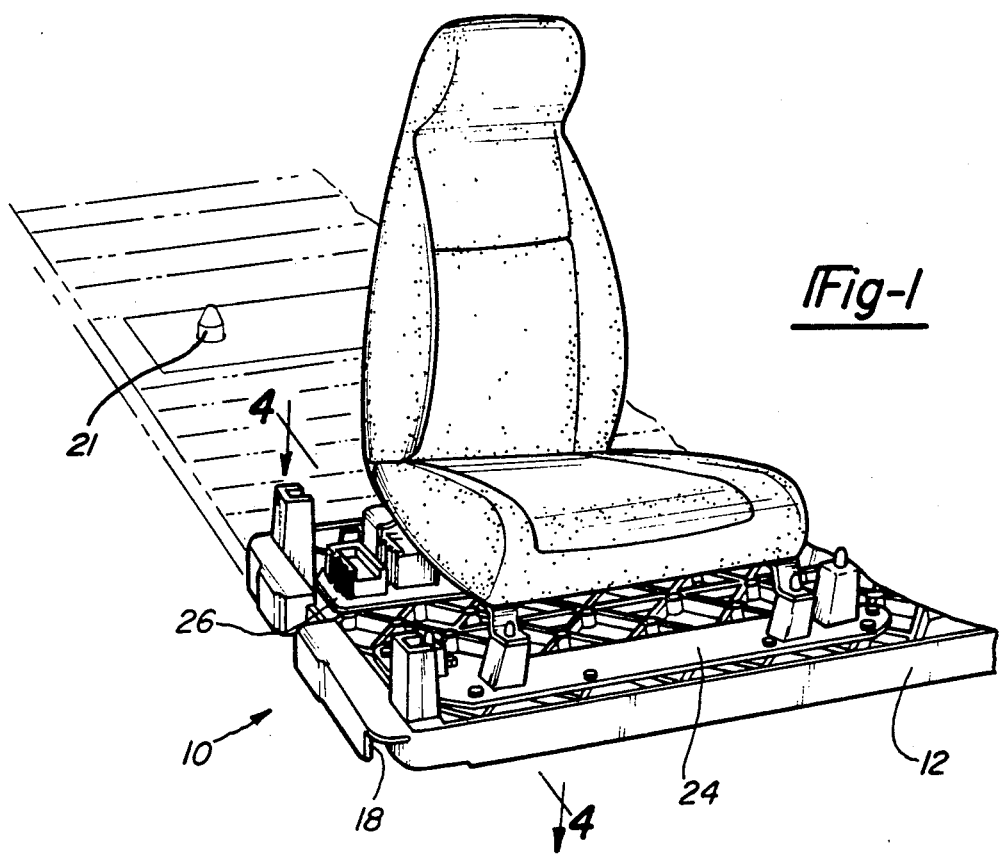
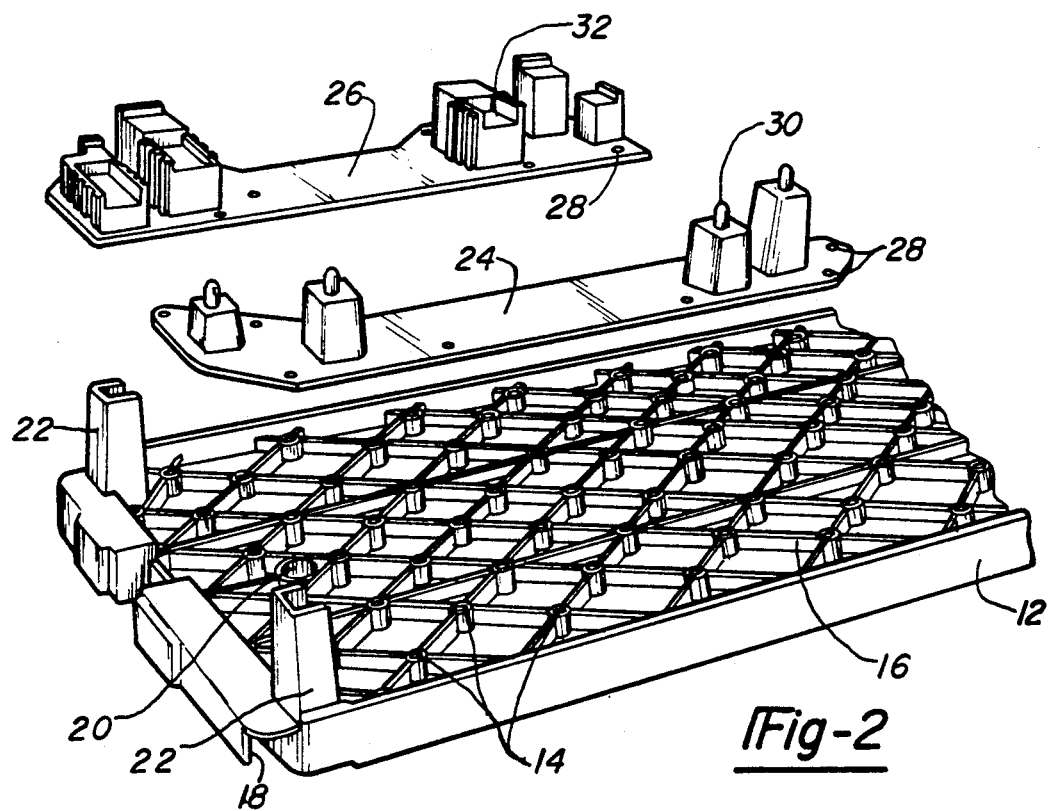

TRANSPORTATION PALLET SYSTEM

This is a continuation of U.S. patent application Ser. No. 384,028, filed July 24, 1989, now abandoned.

BACKGROUND OF THE INVENTION

This invention relates to a transportation pallet system suitable for transporting and transferring a workpiece, such as a prefabricated automobile seat, to an assembly line in a manner adapted to facilitate computer-controlled automated production.

Mass production of a product from its various component elements is well known, especially within the automotive industry, and typically many of the component elements are prefabricated at one location and transported to another site for final assembly into the finished product. For an automobile seat, it is now common practice for the seat to be completely prefabricated at one location, mounted on a supporting base such as a wooden pallet, transported to the final assembly site, subsequently off-loaded from a transportation vehicle, and transferred to the final assembly line where the seat is removed from the support base and assembled into the final vehicle. Often many of these steps, such as transfer of the support base with mounted seat from the transportation vehicle to the assembly line by a manually operated forklift, are labor intensive.

With the advent of computer-assisted manufacturing systems, wherein steps along the final assembly line are computer controlled, and the growing use of real-time delivery of prefabricated components to the final assembly site to eliminate the need and expense of warehousing such prefabricated components, there has developed a need for a transportation supporting base adapted to facilitate automated delivery of such workpieces to the final assembly line and handling along the line. Such a transportation supporting base must allow precise location of the mounted workpieces for precise handling during the computer-controlled manufacturing process. The wooden pallet currently used as a supporting base for such prefabricated automobile seats generally cannot be consistently manufactured within the precise tolerances required for computer-controlled manufacturing, nor are they easily adapted to facilitate automated delivery to and handling along the final assembly line.

Accordingly, it is the primary object of the present invention to provide an improved pallet system that is particularly adapted for transporting trim-complete automotive seats and is designed to enable computer-controlled automated handling thereof.

In addition, it is an object of the present invention to provide an improved pallet system for facilitating automated material handling that is lightweight, durable, dimensionally stable, and yet low in cost.

SUMMARY OF THE INVENTION

In accordance with the present invention, a transportation pallet system suitable for transporting a workpiece, such as a prefabricated automobile seat, to an assembly plant and to facilitate automated delivery to and handling along a final computer-controlled automated production line is provided. Generally, the transportation pallet system comprises two components, a base pallet providing mounting means in multiple positions, and an intermediary footplate which can be mounted in multiple positions upon the mounting means of the base pallet and also capable of supporting at least one workpiece to be transported to and by the automated manufacturing line.

Since precise tolerances are required to facilitate use of an automated computer-controlled production system, the base pallet and the intermediate footplate are preferably formed of a suitable plastic to the required tolerances, by a means such as injection molding. The base pallet can further be provided with locating brackets capable of receiving and engaging the arms of mechanisms used during the mounting of the workpiece to the pallet and transportation of loaded pallets to the final assembly line. It is additionally advantageous to provide the transportation base pallet with a means by which the base pallet and, therefore, the workpiece can be located by the automated production system at the final assembly site, for various functions involved in assembling the automobile seat into the final vehicle.

Additional objects and advantages of the present invention will be apparent to those skilled in the art to which this invention relates, from the subsequent description of the preferred embodiment and the claims, taken in conjunction with the accompanying drawings.

BRIEF DESCRIPTION OF THE DRAWINGS

FIG. 1 is a perspective front view of the subject transportation pallet system upon which is mounted an automobile seat to be transported.

FIG. 2 is an exploded, perspective front view of the transportation pallet system.

DETAILED DESCRIPTION OF THE INVENTION

As shown in FIG. 1, the subject transportation pallet system 10 adapted to transport a workpiece, includes a base pallet 12 and an intermediate footplate which, in the present embodiment, includes a front footplate 24 and a rear footplate 26. In this embodiment, transportation pallet system 10 is used to support a trim-complete automobile seat during its transportation from the site of manufacture to the site of final assembly into an automobile vehicle. As would be appreciated by one skilled in the art, the subject transportation pallet system can be adapted to support other relatively large, prefabricated workpieces for transportation to a final site of assembly.

Figure 3:
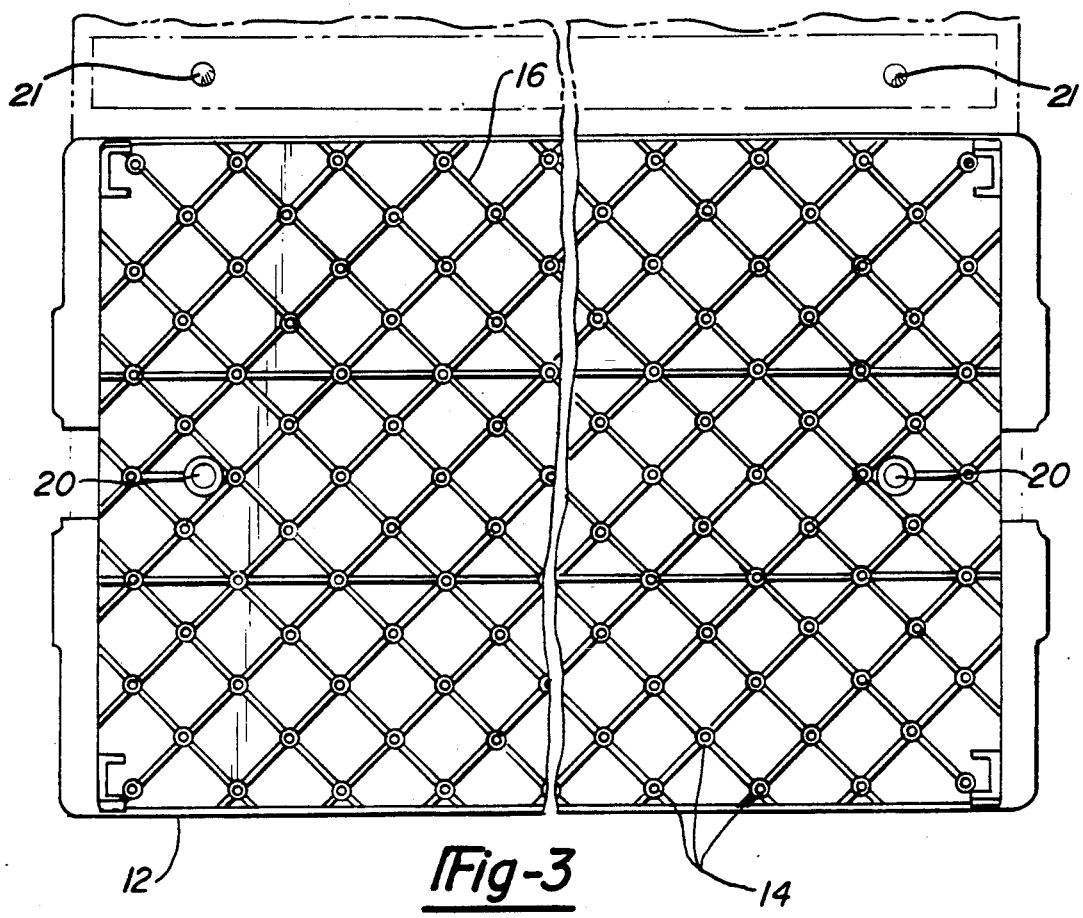
FIG. 3 is a top view of the base pallet.
Figure 4:
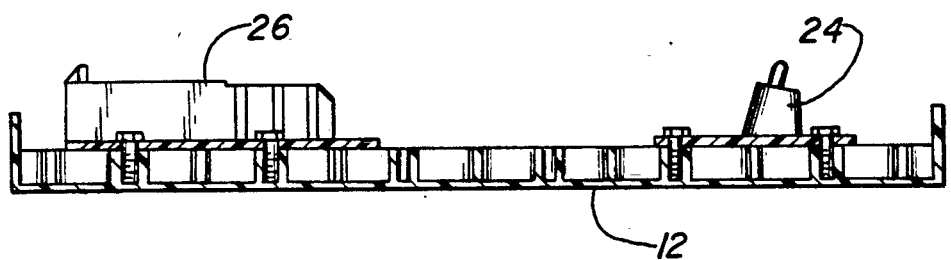
FIG. 4 is a cross-sectional side view of the base pallet taken along the plane 4—4 shown in FIG. 1.

As shown in greater detail in FIGS. 2 and 3, base pallet 12 is provided with multiple position mounting means 14 which, in a preferred embodiment comprises mounting holes in the body of base pallet 12. The holes 14 may be either provided with threaded metal inserts for receiving a mounting screw, or unthreaded holes adapted to receive a mounting bolt to be secured by a mating nut. The present invention also comprehends other fastening systems known to the art which can be precisely located on base pallet 12.

The base pallet 12 according to the present invention comprises a unitary device that is integrally formed by an injection molding process using a suitable plastic material that provides the desired durability and dimensional stability required. In the preferred embodiment, the plastic material used comprises a structural foam polymethylmethacrylate (PMMA")-based plastic. This material was selected for use in the present invention due to it light weight, dimensional and temperature stability, durability, and relatively low cost. Typically, computer-controlled fully automated manufacturing systems require an ability to locate a workpiece to within a tolerance range of approximately 0.5 mm. Accordingly, the base pallet 12 must be manufactured with sufficient dimensional stability to hold tolerances within this tolerance range. Injection molding using structural foam PMMA has produced acceptable results while providing a substantial weight and cost savings versus machined steel.

To provide adequate strength for the supporting function of the transportation pallet system 10, the base pallet 12 is formed with a honeycomb pattern of supporting ribs 16 with the mounting means 14 located at the interstices of the ribs 16, as shown in FIGS. 2 and 3. Additionally, opposing ends of base pallet 12, in a preferred embodiment, are each provided with a locating bracket 18 capable of engaging the arms of transferring mechanisms used to transfer the loaded transportation pallet system 10 during the loading, transporting, and assembly operations.

As shown in FIGS. 2 and 3, base pallet 12 is provided with "datum" means 20, which in the preferred embodiment, comprises a pair of precisely located holes 20. As will subsequently be described in greater detail, the datum or locating holes 20 serve to enable a robotic material-handling device to precisely locate the base pallet 12 and, hence, the footplates 24 and 26 mounted to the base pallet 12. Base pallet 12 is also provided with upstanding lugs 22 which provide convenient means for stacking multiple unloaded base pallets 12. It will be noted that the stacking lugs 22 are preferably of sufficient height to project above the front and rear footplates 24 and 26 when installed on the base pallet 12 to enable the base pallets to be conveniently stacked with the footplates in place.

As further shown in FIG. 2, transportation pallet system 10 also includes a front footplate 24 and a rear footplate 26. Both front footplate 24 and rear footplate 26 are provided with appropriately located mounting holes 28 which enable the footplates 24 and 26 to be precisely positioned and secured to the base pallet 12 in a manner to be subsequently described. As previously noted, the front footplate 24 and rear footplate 26 are secured to base pallet 12 with threaded fasteners or through-bolted to mounting holes 14.

In the preferred embodiment, front footplate 24 is provided with a mounting pin 30 which is appropriately configured to register with the mounting hole in the front portion of the metal frame of the automobile seat to be transported on the pallet system 10. In like manner, rear footplate 26 is provided with mounting slots 32 configured to receive the corresponding rear portion of the metal frame of the automobile seat. As shown in FIG. 2, a preferred embodiment can provide multiple mounting pins 30 upon front footplate 24 and multiple mounting slots 32 upon rear footplate 26 to allow these footplates to be used with automobile seats of different sizes. As would be apparent to one skilled in the art, the top surfaces of front footplate 24 and rear footplate 28 can alternatively be provided with engaging means other than mounting pins 30 and mounting slots 32, respectively, adapted to receivably engage the base of the automobile seat or other workpiece to be transported.

In a preferred embodiment, front footplate 24 and rear footplate 26 are also formed of the same injection molded PMMA-based plastic material used in the manufacture of the base pallet 12. Optionally, however, the footplates 24 and 26 may be manufactured from machined steel, and may further be manufactured as four separate components to support and position each of the four seat frame corners. As a further alternative, the front footplate 24 and rear footplate 26 may be injection molded as a unitary piece if desired.

The footplates 24 and 26 are mounted to the base pallet 12 in the following manner. As previously noted, the datum holes 20 in the base pallet 12 are provided to enable a robotic material-handling device to precisely locate the base pallet 12 and, accordingly, the footprints 24 and 26 mounted to the base pallet 12. To accomplish this, the datum or locating holes 20 are precisely positioned relative to each other and precisely sized (e.g., for 32 mm). The mounting holes 14 in the base pallet 12 are then formed at known locations relative to the datum holes 20. To place the front and rear footplates 24 and 26 in the desired locations relative to the datum holes 20, the holes 28 must be formed in appropriate locations on the footplates 24 and 26 to register with selected mounting holes 14 in the base pallet 12. In the preferred system, the position of the footplates relative to the datum holes 20 is checked in a checking fixture before the footplates 24 and 26 are securely bolted to the base pallet 12. For this reason, the mounting holes 28 in the footplates 24 and 26 are preferably formed with approximately a $\frac{1}{8}$-inch clearance relative to the mounting holes 14 in the base pallet 12 to enable a final precise manual adjustment in the position of the footplates 24 and 26 before their positions are rigidly secured.

Accordingly, in operation, front footplate 24 and rear footplate 26 are precisely located and secured to mounting means 14 on base pallet 12 as described. The automobile seat to be transported is then mounted upon front footplate 24 and rear footplate 26, and secured in an appropriate manner. It will be appreciated, therefore, that in view of the precise positioning of the footplates 24 and 26 on the base pallet 12, the precise location and orientation of the mounted automotive seats relative to the locating holes 20 in the base pallet 12 is established. The loaded pallet is then ready for transfer to a transportation vehicle by a device, such as a forklift, which typically would engage locating brackets 18 during the transfer operation. Locating brackets 18 may also be used advantageously at other points along the loading and transfer of the workpiece to the final production line. In this regard, it will be appreciated by those skilled in the art that the present pallet system is also ideally suited for use with automated material-handling systems for loading and unloading the pallets onto and from the transporting vehicles.

At the final site, the palletized automobile seats are off-loaded from the transportation vehicle and typically placed onto a conveyor system feeding an assembly line. In the preferred system, the exterior dimension of the base pallet 12 is selected to coincide with the size of the conveyor system that the pallets are loaded on so that the pallets will ride between the side rails of the conveyor system. This serves to provide a rough positioning of the pallets on the conveyor system. When a pallet reaches the appropriate station on the line, a pair of 32 mm pins 21 are brought up through the conveyor into registry with the datum holes 20 in the base pallet 12 to precisely position the base pallet 12. Thereafter, a computer-controlled robotic device engages the seats and removes them from the pallet for final installation in the automobile.

The transportation pallet system 10 device can then be returned to the original site of fabrication of the automobile seat or other workpiece, for reuse with footplates 24 and 26 being left mounted on base pallet 12. The user may take advantage of stacking lugs 22 during the reuse steps to stack and transport multiple unloaded transportation pallet system 10 devices.

While the above description constitutes the preferred embodiments of the present invention, it will be appreciated that the invention is susceptible to modification without departing from the proper scope and fair meaning of the accompanying claims.

I claim:

1. A transportation pallet system for transporting a large workpiece such as a vehicle seat, comprising:
   a pallet having associated therewith datum means precisely defining the position and orientation of said base pallet and adapted for precise registration with registration means associated with an underlying support surface, said base pallet having a honeycombed configuration of supporting ribs;
   an intermediary footplate adapted for mounting to said base pallet and including means for supporting said workpiece for transport; and
   mounting means for securing said intermediary footplate to said base pallet at a precise location relative to said datum means such that the position and orientation of said workpiece relative to said datum means is established, said mounting means including holes located at the intersections of said honeycombed supporting ribs.

2. The transportation pallet system of claim 1 wherein said base pallet comprises a unitary device integrally formed by injection molding plastic.

3. The transportation pallet system of claim 2 wherein said datum means establishes the position and orientation of said base pallet within a spatial tolerance range of ±0.5 mm.

4. The transportation pallet system of claim 1 wherein said intermediary footplate is formed by injection molding plastic.

5. The transportation pallet system of claim 3 wherein said base pallet is formed of a polymethylmethacrylate-base plastic.

6. The transportation pallet system of claim 1 wherein said base pallet further comprises supporting brackets located at opposing sides of said base pallet adapted for engagement by a handling device.

7. The transportation pallet system of claim 1 wherein said datum means comprises a pair of precisely sized holes precisely located relative to each other in said base pallet and said registration means comprises a pair of pins precisely sized to the size of the datum holes and precisely located relative to each other at a distance equal to the distance separating the datum holes.

8. The transportation pallet system of claim 1 wherein said base pallet further includes a plurality of stacking lugs to facilitate stacking of multiple base pallets.

9. The transportation pallet system of claim 1 wherein the external dimension of said base pallet is sized to correspond to the dimension of a conveyor system.

10. The transportation pallet system of claim 1 wherein said intermediary footplate comprises a front footplate adapted to mountably engage said base pallet and having a front footplate receiving means to additionally engage a forward portion of the base of a workpiece and a rear footplate adapted to mountably engage said base pallet and having a rear footplate receiving means to additionally engage a rear portion of the base of said workpiece.

11. The transportation pallet system of claim 10 wherein said front footplate and said rear footplate are both formed by injection molding plastic.

12. The transportation pallet system of claim 10 wherein said front footplate receiving means comprises at least one mounting pin adapted to engage a front portion of the base of a workpiece.

13. The transportation pallet system of claim 10 wherein said rear footplate receiving means comprises at least one mounting slot adapted to engage a rear portion of the base of said workpiece.

* * * * *